(12) United States Patent
Rubin et al.

(10) Patent No.: US 12,418,325 B2
(45) Date of Patent: Sep. 16, 2025

(54) APPARATUS, SYSTEM AND METHOD OF BODY PROXIMITY SENSING

(71) Applicant: Intel Corporation, Santa Clara, CA (US)

(72) Inventors: Amir Rubin, Kiryat Ono (IL); Noam Kogos, Ramat Hasharon (IL); Wilfrid D'Angelo, Mougins (FR); Walid El Hajj, Antibes (FR)

(73) Assignee: INTEL CORPORATION, Santa Clara, CA (US)

( * ) Notice: Subject to any disclaimer, the term of this patent is extended or adjusted under 35 U.S.C. 154(b) by 663 days.

(21) Appl. No.: 17/561,494

(22) Filed: Dec. 23, 2021

(65) Prior Publication Data

US 2023/0208474 A1  Jun. 29, 2023

(51) Int. Cl.
*H04B 5/73* (2024.01)
*H04B 5/24* (2024.01)
*H04B 5/72* (2024.01)

(52) U.S. Cl.
CPC .............. *H04B 5/73* (2024.01); *H04B 5/24* (2024.01); *H04B 5/72* (2024.01)

(58) Field of Classification Search
CPC ... H04B 5/73; H04B 5/24; H04B 5/72; H04B 1/3827; H04W 4/80
USPC ......................................................... 455/41.1
See application file for complete search history.

(56) References Cited

U.S. PATENT DOCUMENTS

| | | |
|---|---|---|
| 11,394,417 B1 | 7/2022 | Imana et al. |
| 2013/0210477 A1 | 8/2013 | Peter |
| 2014/0194057 A1* | 7/2014 | Shana'a ............ H04W 52/0245 455/41.1 |
| 2016/0295524 A1* | 10/2016 | Harris, III ........... H04W 52/283 |
| 2018/0328709 A1 | 11/2018 | Jiang |
| 2019/0205628 A1 | 7/2019 | Mofidi et al. |
| 2019/0271775 A1 | 9/2019 | Zhang et al. |
| 2019/0353778 A1 | 11/2019 | Slutsky et al. |
| 2019/0379434 A1 | 12/2019 | Lindskog et al. |
| 2020/0044612 A1 | 2/2020 | Bologna et al. |

(Continued)

FOREIGN PATENT DOCUMENTS

WO   2015/080704   6/2015

OTHER PUBLICATIONS

Search Report for European Patent Application No. 22214734.0, mailed on May 15, 2023, 7 pages.

(Continued)

*Primary Examiner* — Juan A Torres
(74) *Attorney, Agent, or Firm* — Shichrur & Co.

(57) ABSTRACT

For example, an apparatus may include a Body Proximity Sensor (BPS) configured to detect proximity of a wireless communication device to a human body based on wireless communication signals communicated by the wireless communication device. For example, the BPS may include an input to receive loopback information of a Receive (Rx) loopback signal, the Rx loopback signal including a wireless Rx signal received by a receiver of the wireless communication device based on a loopback of a wireless transmit (Tx) signal transmitted by a transmitter of the wireless communication device; and a processor configured to determine a detection result based on the loopback information, the detection result to indicate a detected proximity of the wireless communication device to the human body.

25 Claims, 6 Drawing Sheets

(56) References Cited

U.S. PATENT DOCUMENTS

2020/0374729 A1 11/2020 Alanen et al.
2021/0359774 A1 11/2021 Tertinek et al.
2023/0209377 A1 6/2023 Parker et al.

OTHER PUBLICATIONS

Office Action for U.S. Appl. No. 17/561,364, mailed on May 9, 2024, 26 pages.
IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.
Ali El Amine et al., "Device-Free People Counting Using 5 GHz Wi-Fi Radar in Indoor Environment with Deep Learning", 2020 IEEE Globecom Workshops (GC Wkshps) | 978-1-7281-7307-8/20/$31.00 © 2020 IEEE | DOI: 10.1109/GCWkshps50303.2020.9367393, 6 pages.
Office Action for U.S. Appl. No. 17/561,364, mailed on Jul. 19, 2024, 9 pages.
Office Action for U.S. Appl. No. 17/561,364, mailed on Aug. 29, 2024, 24 pages.
Office Action for U.S. Appl. No. 17/561,364, mailed on Jan. 11, 2024, 44 pages.
Office Action for U.S. Appl. No. 17/561,364, mailed on Dec. 18, 2024, 26 pages.

* cited by examiner

APPARATUS, SYSTEM AND METHOD OF BODY PROXIMITY SENSING

TECHNICAL FIELD

Aspects described herein generally relate to body proximity sensing.

BACKGROUND

A Body Proximity Sensor (BPS) may be configured to detect a proximity of wireless communication device to a human body. For example, the transmission power of the wireless communication device may be reduced based on a detected proximity of the human body, e.g., in accordance with health and/or regulatory requirements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
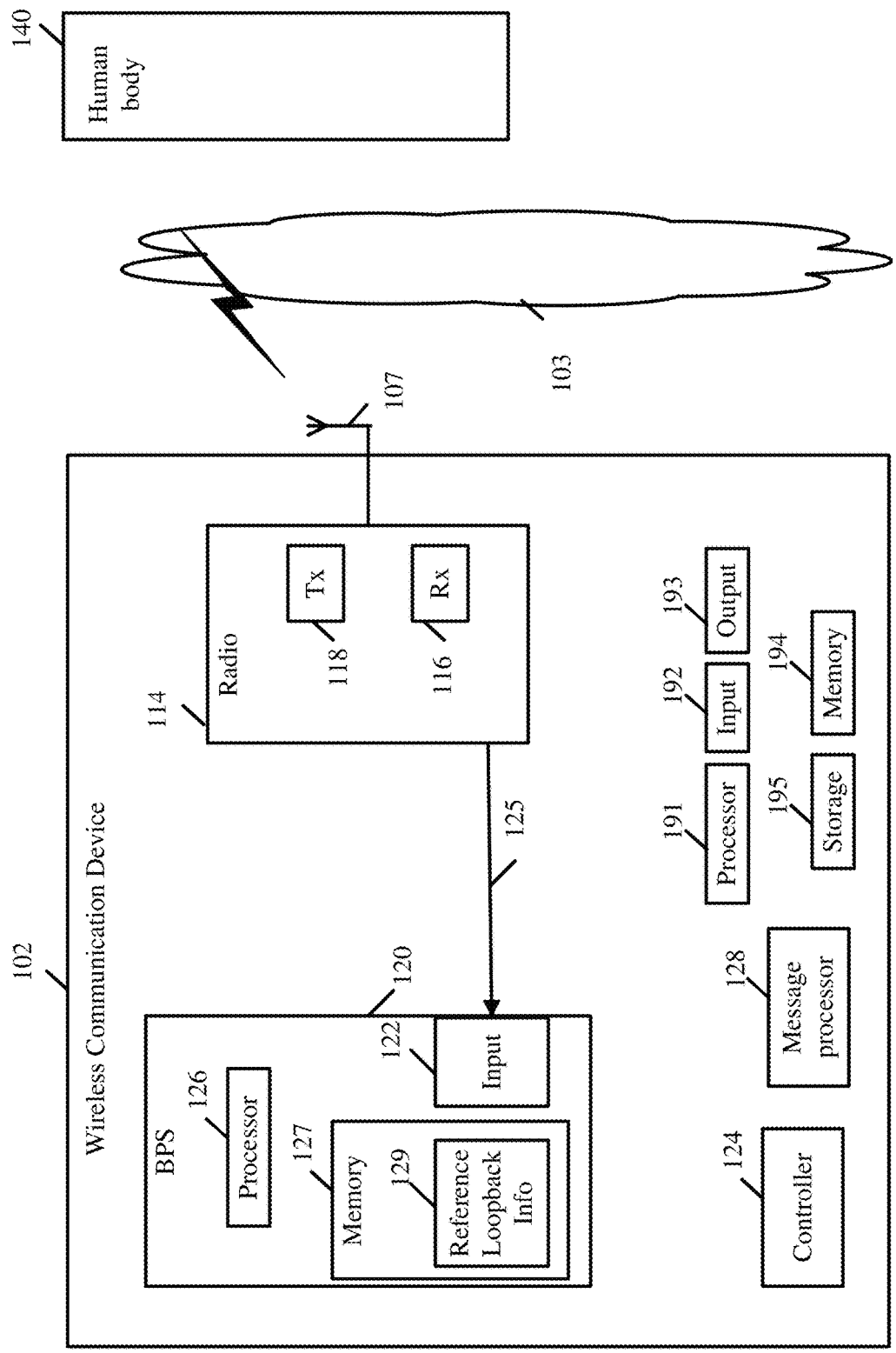
FIG. 1 is a schematic block diagram illustration of a system, in accordance with some exemplary aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (*IEEE 802.11-2020, IEEE Standard for Information Technology—Telecommunications and Information Exchange between Systems Local and Metropolitan Area Networks—Specific Requirements Part* 11: *Wireless LAN Medium Access Control (MAC) and Physical Layer (PHY) Specifications*, December 2020)), and/or future versions and/or derivatives thereof, devices and/or networks operating in accordance with existing cellular specifications and/or protocols, e.g., 3rd Generation Partnership Project (3GPP), 3GPP Long Term Evolution (LTE), Fifth Generation (5G) Specifications, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group) and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some exemplary aspects.

As shown in FIG. 1, in some demonstrative aspects, system 100 may include a wireless communication network including one or more wireless communication devices, e.g., a wireless communication device 102.

In some demonstrative aspects, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a Bluetooth (BT) device, a Bluetooth Low Energy (BLE) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, operate as, and/or perform the functionality of one or more STAs. For example, device 102 may include at least one STA.

In some demonstrative aspects, device 102 may include, operate as, and/or perform the functionality of one or more WLAN STAs.

In some demonstrative aspects, device 102 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative aspects, device 102 may include a non-AP STA or an access point (AP) STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects, device 102 may include, operate as, and/or perform the functionality of a BT device.

In some demonstrative aspects, device 102 may include, operate as, and/or perform the functionality of a cellular communication device.

In some demonstrative aspects, device 102 may include, operate as, and/or perform the functionality of, any other devices and/or STA.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, an Organic LED (OLED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a Solid State Drive (SSD), or other suitable removable or non-removable storage units. Memory unit 194 and/or storage unit 195, for example, may store data processed by device 102.

In some demonstrative aspects, wireless communication device 102 may be capable of communicating content, data, information, and/or signals via a wireless medium (WM) 103.

In some demonstrative aspects, wireless medium 103 may include, for example, a radio channel, a wireless communication channel, a BT channel, a BLE channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6-7 GHz frequency band, a millimeterWave (mmWave) frequency band, e.g., a 60 GHz frequency band, a Sub-1 GHz (S1G) band, and/or any other frequency band.

In some demonstrative aspects, device 102 may include one or more radios including circuitry and/or logic to perform wireless communication between device 102, and one or more other devices. For example, device 102 may include at least one radio 114.

In some demonstrative aspects, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, radio 114 may be configured to communicate over a 2.4 GHz band, a 5 GHz band, a 6-7 GHz band, a 60 GHz band, an S1G band, and/or any other band.

In some demonstrative aspects, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure, and/or arrangement of one or more antenna elements, components, units, assemblies, and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between device 102 and one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative aspects, at least part of the functionality of controller 124 may be implemented as part of one or more elements of radio 114.

In other aspects, the functionality of controller 124 may be implemented as part of any other element of device 102.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of radio 114.

In some demonstrative aspects, at least part of the functionality of message processor 128 may be implemented as part of controller 124.

In other aspects, the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, device 102 may include, operate as, perform the role of, and/or perform one or more functionalities of, one or more STAs.

In some demonstrative aspects, device 102 may form, or may communicate as part of, a wireless local area network (WLAN).

In some demonstrative aspects, device 102 may form, or may communicate as part of, a WiFi network.

In other aspects, device 102 may form, and/or communicate as part of, any other additional or alternative network.

In some demonstrative aspects, wireless communication devices, for example, cellular devices and/or PCs, laptops, and/or the like, may be required to adhere to Specific Absorption Rate (SAR) limitations. In one example, wireless communication device 102 may be required to adhere to one or more SAR limitations, for example, to prevent exposure of a human body 140 to high levels of radio energy.

In some demonstrative aspects, the SAR limitations may require, for example, a low transmission power of wireless communication devices.

In some demonstrative aspects, restricting a wireless communication device to use low transmission power may degrade performance of the wireless communication device. For example, the low transmission power may reduce a range of communication from a transmitting wireless communication device, and/or may reduce throughput at a given distance from a receiving wireless communication device.

In one example, a reduction in the transmission power of between 3-8 dB may be implemented to adhere to SAR requirements. According to this example, a 6 dB reduction in the transmission power may result in a reduction of about 50%, on average, in the operation range.

In some demonstrative aspects, a wireless communication device, e.g., wireless communication device 102, may be configured based on a realization that there may be no need to limit the transmission power of the wireless communication device at all times, for example, in one or more real life scenarios, and/or one or more use cases.

In some demonstrative aspects, a wireless communication device, e.g., wireless communication device 102, may be configured to selectively limit the transmission power of the wireless communication device, for example, based on one or more criteria, e.g., as described below.

In some demonstrative aspects, wireless communication device 102 may be configured to selectively limit the transmission power of the wireless communication device 102, for example, based on one or more criteria relating to a level of proximity of the wireless communication device 102 to the human body 140, e.g., as described below.

In some demonstrative aspects, wireless communication device 102 may be configured to selectively limit the transmission power of the wireless communication device 102, for example, based on a determination that at least part of the human body 140, e.g., a hand, a lap, a head, and/or any other parts of the human body 140, is in close proximity to an emitting antenna of the of wireless communication device, e.g., antennas 107, as described below.

In some demonstrative aspects, wireless communication device 102 may be configured to selectively utilize an increased transmission power level, e.g., a maximal transmission power, for example, based on one or more criteria relating to the level of proximity of the wireless communication device 102 to the human body 140, e.g., as described below.

In some demonstrative aspects, wireless communication device 102 may be configured to selectively utilize an increased transmission power level, e.g., a maximal transmission power, for example, aspect, when the human body 140 is not in close proximity to the emitting antenna of the wireless communication device 102, e.g., as described below.

In some demonstrative aspects, wireless communication device 102 may be configured to utilize an increased transmission power level, e.g., a maximal transmission power, for example, based on a determination that the human body 140 is not in close proximity to the emitting antenna of the wireless communication device 102. For example, wireless communication device 102 may be configured to increase the transmission power, e.g., to its maximum certified level or any other level, for example, to optimize performance of the wireless communication device 102.

In some demonstrative aspects, wireless communication device 102 may be configured to trigger a power transmit limitation, for example, based on a determination that the human body 140 is in vicinity of antennas 107.

In one example, wireless communication device 102 may be configured to trigger a power transmit limitation, for example, only when the human body 140 is in the vicinity of antennas 107. For example, wireless communication device 102 may be configured to allow a transmission power exceeding the power transmit limitation, for example, based on a determination that the human body 140 is not in the vicinity of antennas 107

In some demonstrative aspects, wireless communication device 102 may include a Body Proximity Sensor (BPS) 120 configured to detect proximity of device 102 to the human body 140, e.g., as described below.

In some demonstrative aspects, one or more functionalities and/or operations of BPS 120 may be implemented as part of controller 124. In other aspects, one or more functionalities and/or operations of BPS 120 may be implemented by a dedicated BPS and/or as part of any other element of device 102.

In some demonstrative aspects, for example, in some use cases, scenarios, and/or implementations, there may be one or more disadvantages, inefficiencies, and/or technical problems in implementing a dedicated hardware proximity sensor for detecting proximity to a human body, e.g., as described below.

In one example, a dedicated hardware proximity sensor may include a dedicated hardware component, which may be added to a host device, e.g., a wireless communication device. For example, the dedicated hardware proximity sensor may be connected to the host device on one side and to an antenna on the other side.

In one example, the dedicated hardware proximity sensor may measure capacitance, for example, to detect body proximity of the host device to the human body. For example, the dedicated hardware proximity sensor may perform dedicated transmissions for the purpose of detecting capacitance changes.

Although the dedicated hardware proximity sensor may be implemented to allow avoidance of SAR limitations, for example, when body proximity is not sensed, the use of a dedicated hardware proximity sensor may increase, e.g., considerably increase, a cost of a wireless communication device.

In addition, the use of a dedicated hardware proximity sensor may cause technical issues, for example, as the dedicated hardware proximity sensor may require integration with wireless components of the wireless communication device, e.g., to provide a complete solution.

For example, a technical complexity and/or cost of a wireless communication device implementing a dedicated hardware proximity sensor may increase, for example, by a factor relative to a number of antennas implemented by the wireless communication device.

In some demonstrative aspects, for example, in some use cases, scenarios, and/or implementations, there may be one or more disadvantages, inefficiencies, and/or technical problems in implementing a Time Average SAR (TAS) mechanism to comply with SAR limitations. For example, the TAS mechanism may be implemented by a software feature, which may allow temporary increasing a transmission power, while subjecting the transmission power to a time averaged limit on emission. For example, the TAS mechanism may mitigate performance degradation, for example, by calculating the "budget" of the allowed transmission power and averaging the transmission power, e.g., over time.

In one example, the TAS may mechanism may be operated continuously, for example, regardless of whether or not there is any condition of body proximity. Accordingly, the TAS mechanism may limit a peak Tx and/or Rx throughput, e.g., in many benchmark scenarios.

In another example, the TAS mechanism may be limited, for example, due to a lack of a finalized regulatory process and/or test methodology. For example, the TAS mechanism may not be effective, for example, if a transmission duty cycle is high, e.g., in case of high traffic.

In some demonstrative aspects, for example, in some use cases, scenarios, and/or implementations, there may be one or more disadvantages, inefficiencies, and/or technical problems in an implementation utilizing device-state sensing to trigger the SAR limitations, for example, based on a device state or mode of operation.

For example, device-state sensing trigger SAR limitations for a wireless communication device, e.g., when the wireless communication device is being used in a certain manner. In one example, the SAR limitations may be triggered for a PC laptop device, for example, at a tablet mode or a clamshell mode of the PC laptop device.

In one example, an implementation utilizing device-state sensing may not be accurate enough, and/or may trigger the SAR limitations unnecessarily. For example, the SAR limitations may be triggered, when the wireless communication device is at a predefined mode, although the user of the wireless communication device is not actually in proximity to the wireless communication device.

In some demonstrative aspects, for example, in some use cases, scenarios, and/or implementations, there may be one or more disadvantages, inefficiencies, and/or technical problems in an implementation using mmWave wireless technologies for sensing body proximity. For example, mmWave platforms may utilize transmissions that may not adhere to wireless communication standard structure, and/or regulatory constraints.

In some demonstrative aspects, BPS 120 may be configured to detect proximity of wireless communication device 102 to the human body 140, for example, based on wireless communication signals communicated by wireless communication device 102, e.g., as described below.

In some demonstrative aspects, BPS 120 may be configured to detect proximity of wireless communication device 102 to the human body 140, for example, based on transmissions that adhere to wireless communication standard structure and/or regulatory constraints, e.g., as described below.

In some demonstrative aspects, BPS 120 may be configured to detect proximity of wireless communication device 102 to the human body 140, for example, based on transmissions over RF frequencies in a frequency band below 10 GHz, e.g., as described below. In other aspects, any other frequency band may be used.

In some demonstrative aspects, BPS 120 may be configured to support a technical solution, which may utilize and/or reuse wireless capabilities, e.g., WiFi capabilities, which are already and/or anyway in wireless communication device 102, for example, for identification of proximity of human body 140 to wireless communication device 102, e.g., as described below.

In some demonstrative aspects, BPS 120 may be configured to support a technical solution, which may improve, e.g., optimize, performance of wireless communication device 102, for example, even without adding cost and/or complexity, e.g., as described below.

In some demonstrative aspects, BPS 120 may be configured to use transmissions via antennas 107, for example, to detect whether the human body 140 is in the vicinity of the antennas 107, e.g., as described below.

In some demonstrative aspects, BPS 120 may be configured to detect whether the human body 140 is in the vicinity of the antennas 107, for example, based on measurements of properties of a wireless Tx signal communicated via the antennas 107, e.g., as described below.

In some demonstrative aspects, BPS 120 may be configured to detect whether the human body 140 is in the vicinity of the antennas 107, for example, based on an estimation of one or more pre-distortion coefficients, e.g., as described below.

In some demonstrative aspects, the one or more pre-distortion coefficients may include, or may be based on one or more-distortion coefficients, which may be used for linearizing a Tx path distortion, e.g., as described below. In other aspects, the one or more pre-distortion coefficients may include one or more other or additional coefficients.

In some demonstrative aspects, an implementation to detect whether the human body 140 is in the vicinity of the wireless communication device 102, for example, based on wireless communication signals communicated by wireless communication device 102, e.g., as described herein, may support a technical solution, which may allow a computing device to sense whether the human body is in proximity to antennas of the computing device, and to optimize a transmit power of the computing device accordingly. This implementation may provide a technical solution, which may be broadly implemented, for example, for any device, which implements wireless components, e.g., cellular devices, PC laptops, or the like.

In some demonstrative aspects, an implementation to detect whether the human body 140 is in the vicinity of the wireless communication device 102, for example, based on wireless communication signals communicated by wireless communication device 102, e.g., as described herein, may support a technical solution, which does not require any major additional components, and/or dedicated hardware. Therefore, this implementation may provide a technical solution, which does not require any substantial additional Bill of Material (BOM) cost.

In some demonstrative aspects, an implementation to detect whether the human body 140 is in the vicinity of the wireless communication device 102, for example, based on wireless communication signals communicated by wireless communication device 102, e.g., as described herein, may provide a technical solution, which may be competitive, e.g., exceptionally competitive, for example, in comparison to implementations utilizing dedicated hardware proximity sensors, which require dedicated HW resulting in a meaningful increase in products cost.

In some demonstrative aspects, an implementation to detect whether the human body 140 is in the vicinity of the wireless communication device 102, for example, based on wireless communication signals communicated by wireless communication device 102, e.g., as described herein, may support a technical solution, which may optimize throughput versus range performance, for example, even without addition of any additional, e.g., dedicated, components. For example, according to lab results performed in a regulatory lab, in some platforms an achievable gain may exceed 5 dBs, which may extend cell range, e.g., by more than 50%.

In some demonstrative aspects, BPS 120 may be configured to detect proximity of wireless communication device 102 to a human body 140, for example, based on wireless communication signals communicated by the wireless communication device 102, e.g., as described below.

In some demonstrative aspects, BPS 120 may include an input 122 to receive loopback information 125 of an Rx loopback signal, e.g., as described below.

In some demonstrative aspects, the Rx loopback signal may include a wireless Rx signal received by receiver 116 of the wireless communication device 102, for example, based on a loopback of a wireless Tx signal transmitted by transmitter 118 of the wireless communication device 102, e.g., as described below.

In some demonstrative aspects, BPS 120 may be configured to instruct the wireless communication device 102 to transmit the Tx signal over a predefined wireless communication channel for proximity sensing, e.g., as described below.

In some demonstrative aspects, BPS 120 may be configured to instruct the wireless communication device 102 to transmit the Tx signal, for example, based on a proximity sensing criterion, e.g., as described below.

In some demonstrative aspects, BPS 120 may be configured to instruct the wireless communication device 102 to periodically transmit the Tx signal, for example, based on a proximity sensing periodicity, e.g., as described below.

In other aspects, BPS 120 may be configured to instruct the wireless communication device 102 to transmit the Tx signal according to any other additional or alternative setting and/or criteria.

In some demonstrative aspects, BPS 120 may include a processor 126 configured to determine a detection result based on the loopback information 125, e.g., as described below.

In one example, one or more functionalities and/or operations of processor 126 may be implemented as part of controller 124.

In another example, one or more functionalities and/or operations of processor 126 may be implemented as part of processor 191.

In another example, one or more functionalities of processor 126 may be implemented by one or more other elements of wireless communication device 102, for example, by one or more dedicated and/or separate elements, which may be separate from BPS 120.

In some demonstrative aspects, the detection result may indicate a detected proximity of the wireless communication device 102 to the human body 140, e.g., as described below.

In some demonstrative aspects, BPS 120 may be configured to output an SAR limitation indication, for example, based on the detection result, e.g., as described below.

In some demonstrative aspects, BPS 120 may be configured to output a Tx power limitation, for example, based on the detection result, e.g., as described below.

In some demonstrative aspects, the Tx power limitation may be configured to limit a Tx power of the transmitter 118 of the wireless communication device 102, e.g., as described below.

In some demonstrative aspects, BPS 120 may include a memory 127 to store reference loopback information 129, e.g., as described below.

In some demonstrative aspects, processor 126 may be configured to determine the detection result, for example, based on a comparison between the loopback information 125 and the reference loopback information 129, e.g., as described below.

In some demonstrative aspects, processor 126 may be configured to determine the detection result, for example, based on a Tx path function, e.g., as described below.

In some demonstrative aspects, processor 126 may be configured to identify a Tx path function based on the loopback information 125, e.g., as described below.

In some demonstrative aspects, the Tx path function may be based, for example, on the Tx signal and the Rx signal, e.g., as described below.

In some demonstrative aspects, processor 126 may be configured to determine the detection result, for example, based on the Tx path function, e.g., as described below.

In some demonstrative aspects, processor 126 may be configured to identify a plurality of coefficients of the Tx path function, for example, based on the loopback information 125, e.g., as described below.

In some demonstrative aspects, processor 126 may be configured to determine the detection result, for example, based on the plurality of coefficients of the Tx path function, e.g., as described below.

In some demonstrative aspects, processor 126 may be configured to determine the detection result, for example, based on a comparison between the plurality of coefficients of the Tx path function and a plurality of reference coefficients of a reference Tx path function, e.g., as described below.

In some demonstrative aspects, reference loopback information 129 may include the plurality of reference coefficients of a reference Tx path function.

In some demonstrative aspects, processor 126 may be configured to determine the detection result, for example, based on a comparison between a difference result and a difference threshold, e.g., as described below.

In some demonstrative aspects, the difference result may be based on a difference between a coefficient of the Tx path function and a reference coefficient of the reference Tx path function, e.g., as described below.

In some demonstrative aspects, the difference threshold may include a preconfigured threshold, for example, based on a configuration of the wireless communication device 102 e.g., as described below.

In some demonstrative aspects, reference loopback information 129 may include the preconfigured threshold.

In some demonstrative aspects, the Tx path function may include a Tx distortion function representing an estimated distortion of the Tx signal in a wireless transmission path between the transmitter 118 of the wireless communication device 102 and the receiver 116 of the wireless communication device 102, e.g., as described below.

In some demonstrative aspects, the Tx path function may include a Voltage Standing Wave Ratio (VSWR) function representing an estimated VSWR of a wireless transmission path between the transmitter 118 of the wireless communication device 102 and the receiver 116 of the wireless communication device 102, e.g., as described below.

In some demonstrative aspects, the Tx path function may be estimated according to Volterra model of a Volterra series.

In one example, the Tx path function may be estimated according to a Memory Polynomial (MP) model, e.g., as follows:

$$y(n)=\sum_{j=0}^{M-1}\sum_{i=1}^{N}a_{i,j}|x(n-j)|^{i-1}x(n-j) \quad (1)$$

wherein x(n) denotes a Tx signal; y(n) denotes an Rx signal, e.g., based on a loopback of the Tx signal; M denotes a memory depth; N denotes a highest polynomial order; and $a_{i,j}$ denote complex coefficients.

According to this example, processor 126 may be configured to identify the coefficients $a_{i,j}$ of the Tx path function according to the MP model of Equation 1, for example, based on the loopback information 125.

According to this example, processor 126 may be configured to determine the detection result, for example, based on the plurality of coefficients $a_{i,j}$ of the Tx path function.

For example, processor 126 may be configured to determine the detection result, for example, based on a comparison between the plurality of coefficients $a_{i,j}$ of the Tx path function and a plurality of reference coefficients of a reference Tx path function, e.g., as described below.

In other aspects, the Tx path function may be estimated according to any other additional or alternative model, and/or the detection result may be determined according to any other coefficients and/or any other information, which is based on the loopback information 125.

Figure 2:
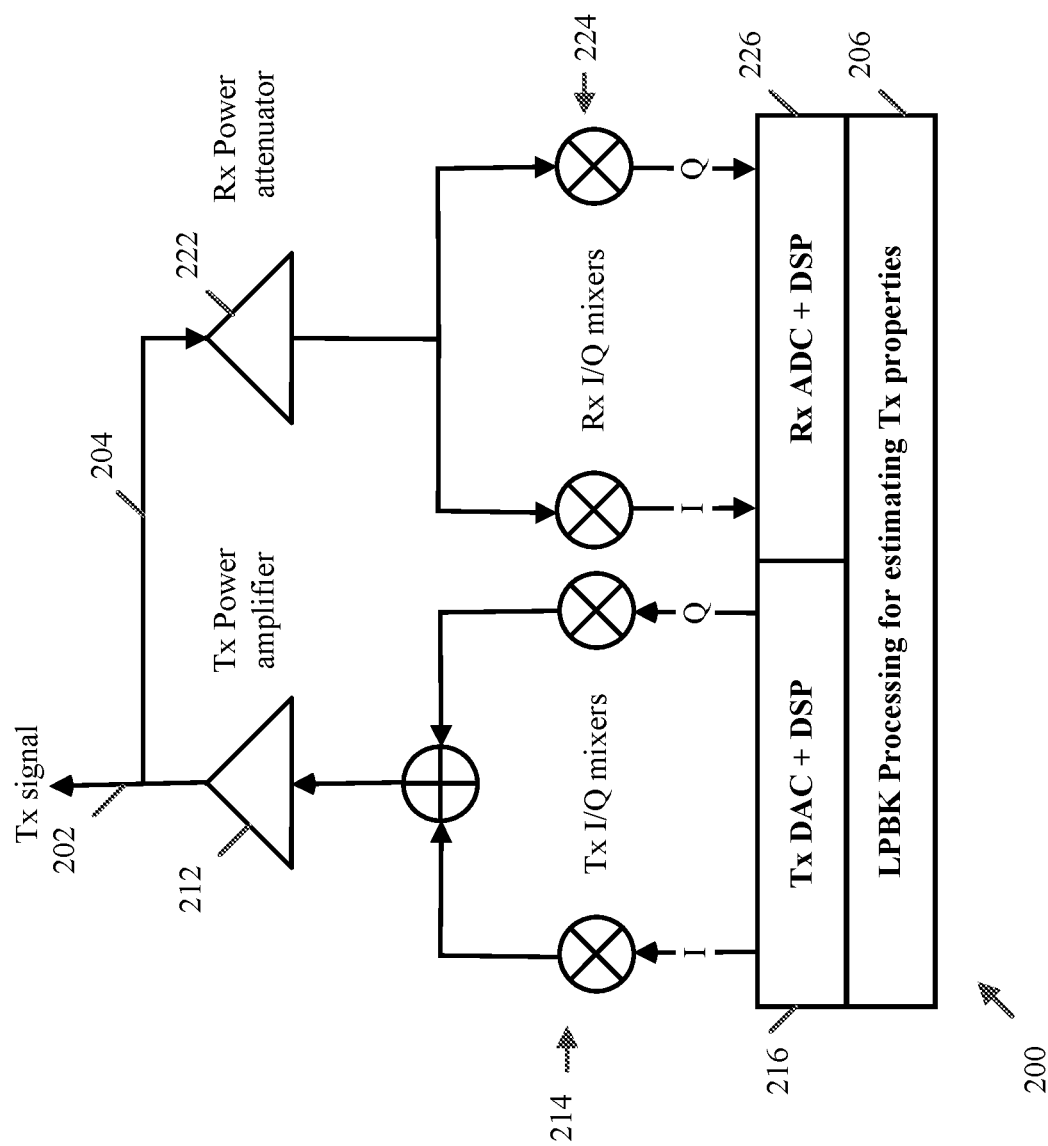
FIG. 2 is a schematic illustration of a loopback processing scheme, in accordance with some exemplary aspects.

Reference is made to FIG. 2, which schematically illustrates a loopback processing scheme 200, in accordance with some demonstrative aspects.

In one example, BPS 120 (FIG. 1) may detect proximity of wireless communication device 102 (FIG. 1) to human body 140 (FIG. 1), for example, based on loopback information 125 (FIG. 1), which may be generated according to loopback processing scheme 200.

In some demonstrative aspects, as shown in FIG. 2, a Tx signal 202 may be transmitted, for example, by a transmitter of a wireless communication device, e.g., transmitter 118 (FIG. 1).

In some demonstrative aspects, as shown in FIG. 2, Tx signal 202 may be generated based on a digital signal, which may be generated by a processor 216, mixed by Tx I/Q mixers 214, and/or amplified by a Tx power amplifier 212.

In some demonstrative aspects, as shown in FIG. 2, an Rx signal 204 may be received, for example, based on Tx signal 202, for example, by a receiver of the wireless communication device, e.g., receiver 116 (FIG. 1).

In some demonstrative aspects, as shown in FIG. 2, Rx signal 204 may be attenuated by an Rx power attenuator 222, may be mixed by Rx I/Q mixers 224, and/or may be digitally processed by a processor 226.

In some demonstrative aspects, as shown in FIG. 2, a processor 206 may be configured to determine loopback information of the Rx signal 204, which may be based on loopback of the Tx signal 202 from the transmitter to the receiver.

In some demonstrative aspects, a wireless communication device, e.g., wireless communication device 102 (FIG. 1), may utilize one or more loopbacks, e.g., according to the loopback processing scheme 200, for example, over part of, or over an entirety of, a transmission path.

In some demonstrative aspects, the loopbacks may allow estimations of the one or more properties of the wireless transmission path.

In some demonstrative aspects, the loopbacks, e.g., over an entire transmission path, may be utilized to estimate one or more properties of the wireless transmission path for body proximity sensing, for example, even without additional hardware components and/or blocks.

In some demonstrative aspects, BPS 120 (FIG. 1) may be configured to indicate a detected proximity of the wireless communication device 102 (FIG. 1) to the human body 140 (FIG. 1), for example, based on the loopback information of the Rx signal 204.

In some demonstrative aspects, processor 206 may be configured to estimate one or more properties of a wireless transmission path between the transmitter and the receiver of the wireless communication device 102 (FIG. 1), for example, based on the loopback information of the Rx signal 204, e.g., as described below.

In some demonstrative aspects, BPS 120 (FIG. 1) may be configured to indicate a detected proximity of the wireless communication device 102 (FIG. 1) to the human body 140 (FIG. 1), for example, based on a comparison between the one or more properties of the wireless transmission path and one or more reference properties of a reference transmission path, e.g., as described below.

In some demonstrative aspects, the one or more reference properties of a reference transmission path may include properties of a reference transmission path, for example, with no body proximity, e.g., at a production line or any other setting or scenario.

In some demonstrative aspects, processor 206 may be configured to determine an estimated Tx path function, for example, based on the loopback information of the Rx signal 204.

In some demonstrative aspects, BPS 120 (FIG. 1) may be configured to indicate a detected proximity of the wireless communication device 102 (FIG. 1) to the human body 140 (FIG. 1), for example, based on the estimated Tx path function.

In some demonstrative aspects, processor 206 may be configured to estimate the one or more properties of the wireless transmission path between the transmitter and the receiver of the wireless communication device 102 (FIG. 1), for example, by determining a set of coefficients of a model for an estimated distortion of the transmission path of the wireless communication device.

For example, processor 206 may be configured to determine the set of coefficients of the model for the estimated distortion of the transmission path, for example, based on the loopback information of the Rx signal 204.

In some demonstrative aspects, processor 206 may be configured to estimate the one or more properties of the wireless transmission path between the transmitter and the receiver of the wireless communication device 102 (FIG. 1), for example, by determining an estimated VSWR of the transmission path.

For example, processor 206 may be configured to determine the estimated VSWR of the transmission path, for example, based on the loopback information of the Rx signal 204.

In other aspects, any other additional or alternative estimation may be implemented to estimate the one or more properties of the wireless transmission path between the transmitter and the receiver of the wireless communication device.

In some demonstrative aspects, tests executed in a regulatory lab provide results, which show that body proximity of human tissue, e.g., in a level relevant to SAR regulatory requirements, may have a detectable impact on one or more properties of the wireless transmission path.

During these tests, distortion and pre-distortion coefficients of the transmission path were estimated, with and without body proximity. The tests with body proximity were executed lab with respect to body proximity ranges over a set of SAR relevant distances, which were measured between a wireless communication device and a liquid imitating a human tissue. These tests confirmed the detectable impact of the body proximity on the distortion and pre-distortion coefficients of the transmission path.

Specifically, the tests show that detection of a change in the pre-distortion coefficients, which exceeds a predefined threshold, may indicate body proximity of human tissue, which may require a limitation of the time averaged transmission power.

More specifically, the tests show that the distortion coefficients may be utilized, with a high level of confidence, to avoid limitation of the time averaged transmission power, for example, when the change in the pre-distortion coefficients does not exceed the predefined threshold.

In some demonstrative aspects, BPS (FIG. 1) may be configured to compare one or more pre-distortion coefficients, e.g., which may be determined according to the loopback processing scheme 200, with one or more reference pre-distortion coefficients, e.g., according to loopback reference information 129 (FIG. 1). In one example, the one or more reference pre-distortion coefficients may correspond to a scenario without any body proximity. For example, the one or more reference pre-distortion coefficients may be preconfigured, for example, at a production line.

In some demonstrative aspects, BPS (FIG. 1) may be configured to compare the one or more pre-distortion coefficients with the one or more reference pre-distortion coefficients, e.g., periodically. In other aspects, BPS (FIG. 1) may be configured to compare the one or more pre-distortion coefficients with the one or more reference pre-distortion coefficients based on any other setting and/or criteria.

In some demonstrative aspects, BPS (FIG. 1) may be configured to determine detection of a proximity of wireless communication device 102 (FIG. 1) to human body 140 (FIG. 1), for example, based on a determination that a difference between the one or more pre-distortion coefficients and the one or more reference pre-distortion coefficients exceeds a detection threshold.

For example, a change exceeding a selected threshold may lead to decision on body proximity, which, in turn, may trigger receptive limitation of transmission power. The limitation of transmission power may depend, for example, on the maximal range that the BPS is assumed to cover, and/or any other parameter.

In some demonstrative aspects, there may be a tradeoff a detection range of the BPS and a probability of false alarms, e.g., a probability that body proximity will be erroneously detected. For example, increasing the detection range may lead to higher transmission power when human tissue is not sensed, while the increased detection range may result in an increase of the probability of false alarm on body proximity. This increased probability of false alarms may lead to frequent unnecessary limitation of the transmission power. On the other hand, reducing the detection range may reduce the transmission power when human tissue is not sensed, while the probability of false alarms, which may result in unnecessary limitation of the transmission power, may be reduced as well.

Figure 3:
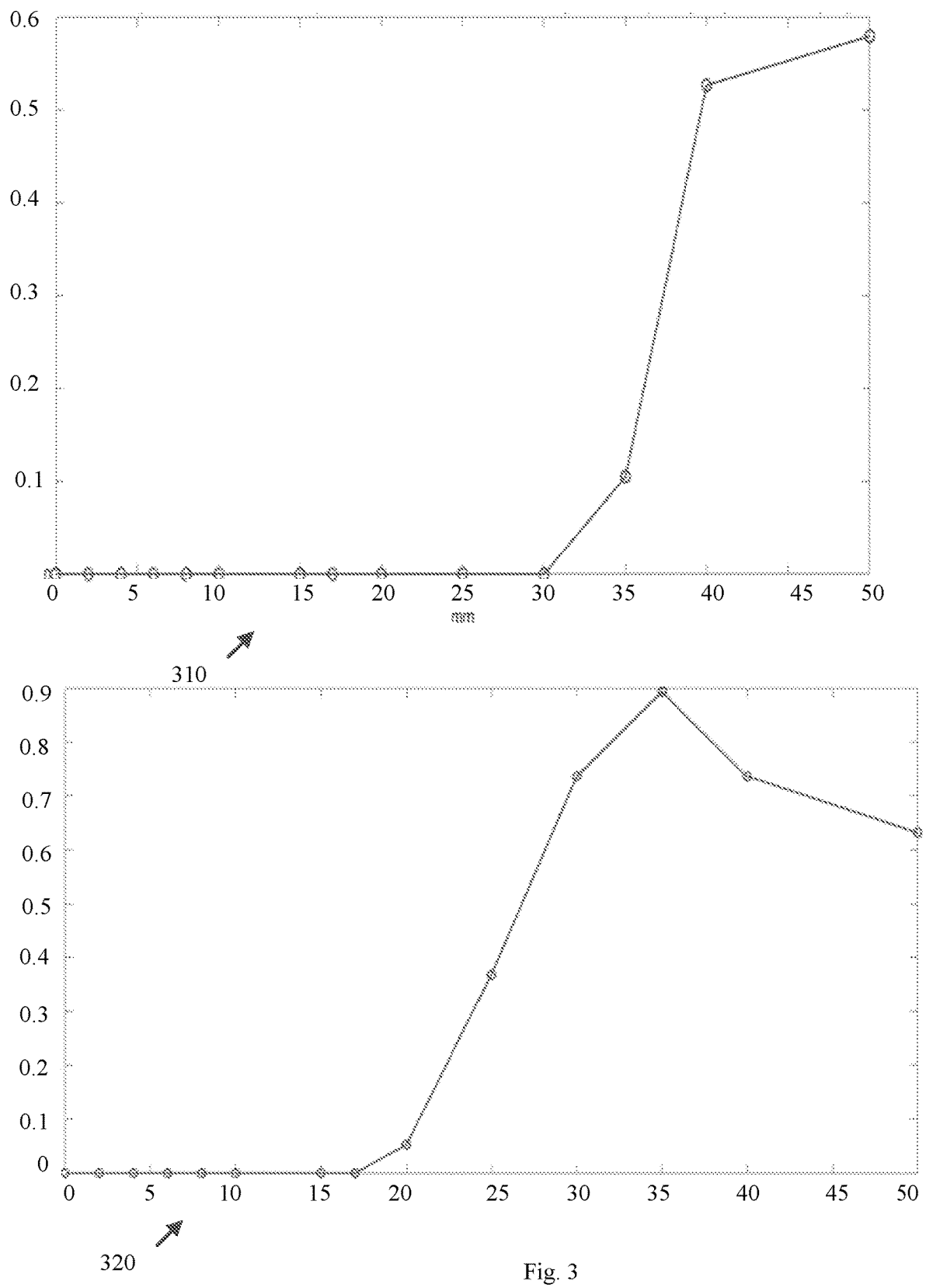
FIG. 3 is a schematic illustration of graphs depicting probabilities of false detection of proximity to a human body versus a sensing distance, in accordance with some demonstrative aspects.

Reference is made to FIG. 3, which schematically illustrates graphs depicting probabilities of false detection of proximity to a human body versus a sensing distance, in accordance with some demonstrative aspects.

In one example, a graph 310 depicts a plurality of probabilities of false detection of proximity to a human body at a plurality of target sensing distances according to a first BPS implementation.

In one example, a graph 320 depicts a plurality of probabilities of false detection of proximity to a human body at a plurality of sensing distances according to a second BPS implementation.

In one example, the graph 310 and the graph 320 depict lab results, which were extracted with a platform model for which a transmission power must be considerably reduced, e.g., without BPS.

In some demonstrative aspects, the lab results of graphs 310 and 310 were captured for 40 MHz WiFi channels in a 2.4 GHz wireless communication frequency band, for example, at a center frequency of 2452 MHz, for 3 different platform samples, of 2 different platform models of BPS.

In some demonstrative aspects, as shown in FIG. 3, for a sensing range less than 10 millimeter (mm), a probability of false alarm may be very low.

For example, according to BPS implementation corresponding to graph 310 a sensing range up to 35 mm may still support very low probability of false alarm.

For example, according to BPS implementation corresponding to graph 320 a sensing range up to 17 mm may still support very low probability of false alarm.

In some demonstrative aspects, the sensing range of 10 mm may provide a gain of about 7 dB to the transmission power, e.g., from ~10 dBm to ~17 dBm.

Figure 4:
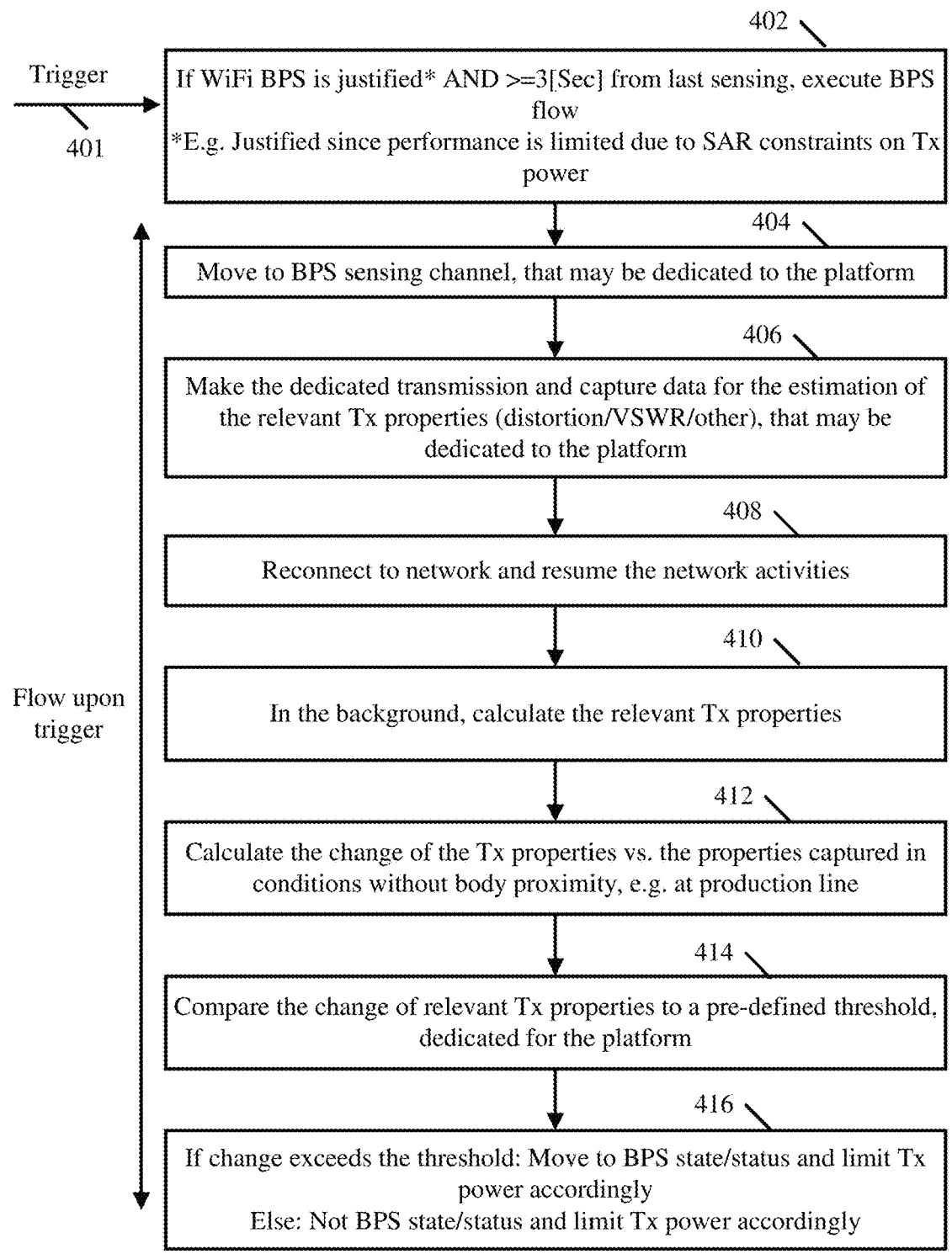
FIG. 4 is a schematic flow-chart illustration of a method of detecting proximity of a wireless communication device to a human body, in accordance with some demonstrative aspects.

Reference is made to FIG. 4, which schematically illustrates a method of detecting proximity of a wireless communication device to a human body, in accordance with some demonstrative aspects. For example, one or more operations of the method of FIG. 4 may be performed by one or more elements of a system, e.g., system 100 (FIG. 1), for example, a wireless device, e.g., device 102 (FIG. 1), a BPS, e.g., BPS 120 (FIG. 1), a processor, e.g., processor 126 (FIG. 1), a controller, e.g., controller 124 (FIG. 1), a radio, e.g., radio 114 (FIG. 1), and/or a receiver, e.g., receiver 116 (FIG. 1).

In some demonstrative aspects, as shown in FIG. 4, the method of FIG. 4, may be initiated upon a trigger 401.

In some demonstrative aspects, as indicated at block 402, the method may include determining whether body proximity sensing is required, and whether a predefined period of time, e.g., 3 seconds or any other period, has passed since a last instance of body proximity sensing. For example, the body proximity sensing may be required, for example, when one or more SAR limitations and/or constraints are to be applied to a transmission power of the wireless communication device. For example, processor 126 (FIG. 1) may be configured to cause, trigger, and/or control the wireless communication station implemented by device 102 (FIG. 1) to periodically perform body proximity sensing, e.g., according to a proximity sensing periodicity.

In some demonstrative aspects, as indicated at block 404, the method may include switching to a predefined wireless communication channel for proximity sensing, e.g., based on a determination that body proximity sensing is to be performed. For example, processor 126 (FIG. 1) may be configured to cause, trigger, and/or control the wireless communication station implemented by device 102 (FIG. 1) to switch to the predefined wireless communication channel for body proximity sensing.

In some demonstrative aspects, the body proximity sensing may be performed using wireless signals transmitted over a predefined wireless communication channel for body proximity sensing, e.g., as indicated at block 404. In one example, the wireless communication channel for body proximity sensing may include a channel which may be identified as a "best" RF channel for body proximity sensing. For example, the "best" identified RF channel for sensing may be used, for example, when sensing performance is to be prioritized.

In one example, performing the body proximity sensing using the predefined wireless communication channel for body proximity sensing, e.g., the "best" RF channel, may require forcing network disconnection for dedicated transmissions for the proximity sensing.

In some demonstrative aspects, the body proximity sensing may be performed using wireless signals transmitted over an operational connection, e.g., an RF channel being used for wireless communication with one or more other devices.

In one example, performing the body proximity sensing using system transmissions in the operational connection may result in degraded body sensing performance.

In some demonstrative aspects, as indicated at block 406, the method may include transmitting Tx signals and capturing loopback information for estimation of one or more properties of a wireless transmission path between the transmitter of the wireless communication device and the receiver of the wireless communication device. For example, processor 126 (FIG. 1) may be configured to cause, trigger, and/or control the wireless communication station implemented by device 102 (FIG. 1) to transmit the Tx signals and to capture the loopback information 125 (FIG. 1) for the estimation of the one or more properties of the wireless transmission path between transmitter 118 (FIG. 1) and receiver 116 (FIG. 1).

In one example, the one more properties of the wireless transmission path may include the estimated distortion of the Tx signal. In another example, one more properties of the wireless transmission path may include the estimated VSWR of the wireless transmission path. In other aspects, the one more properties of the wireless transmission path may include any other additional or alternative properties of the wireless transmission path. For example, one more relevant properties of the wireless transmission path may be selected and/or dedicated, for example, according to a platform used.

In some demonstrative aspects, as indicated at block 408, the method may include reconnecting to a network and resuming network activities, e.g., upon completion of the communication of the wireless signals for the body proximity sensing. For example, processor 126 (FIG. 1) may be configured to cause, trigger, and/or control the wireless communication station implemented by device 102 (FIG. 1) to reconnect to the network and resume network activities.

In some demonstrative aspects, as indicated at block 410, the method may include determining one or more properties of the wireless transmission path, e.g., while performing the network activities. For example, processor 126 (FIG. 1) may be configured to determine the one or more properties of the wireless transmission path based on the loopback information 125 (FIG. 1), e.g., as described above.

In some demonstrative aspects, as indicated at block 412, the method may include determining a difference ("Tx property difference") between the one or more properties of the wireless transmission path and one or more reference properties. For example, the reference properties may correspond to a scenario without human body proximity, e.g., as may be determined at a production line of the wireless communication device. For example, processor 126 (FIG. 1) may be configured to determine the difference between the loopback information 125 (FIG. 1) and reference loopback information, and/or between the plurality of coefficients of the Tx path function and the plurality of reference coefficients of the reference Tx path function, e.g., as described above.

In some demonstrative aspects, as indicated at block 414, the method may include comparing the Tx property difference to a threshold. For example, the threshold may include a predefined threshold, e.g., which may be dedicated and/or specific to a platform of the wireless communication device. For example, processor 126 (FIG. 1) may be configured to compare the Tx property difference to the predefined threshold, e.g., as described above.

In some demonstrative aspects, as indicated at block 416, the method may include switching to a BPS-detected state, for example, if the Tx property difference exceeds the threshold. For example, the BPS-detected state may indicate that human body proximity is detected, and that the transmission power of the wireless communication device is to be limited, e.g., according to SAR requirements.

In some demonstrative aspects, as indicated at block 416, the method may include indicating a non-BPS-detected state, for example, if the Tx property difference does not exceed the threshold. For example, For example, the non-BPS-detected state may indicate that human body proximity is not detected, and that any limitation on Tx power should be performed according to any limitations corresponding to a scenario without human body proximity. For example, processor 126 (FIG. 1) may be configured to selective cause, trigger, and/or control the wireless communication station implemented by device 102 (FIG. 1) to move to the BPS state and/or to limit the transmission power of device 102 (FIG. 1), for example, based on the comparison between the Tx property difference and the threshold, e.g., as described above.

Figure 5:
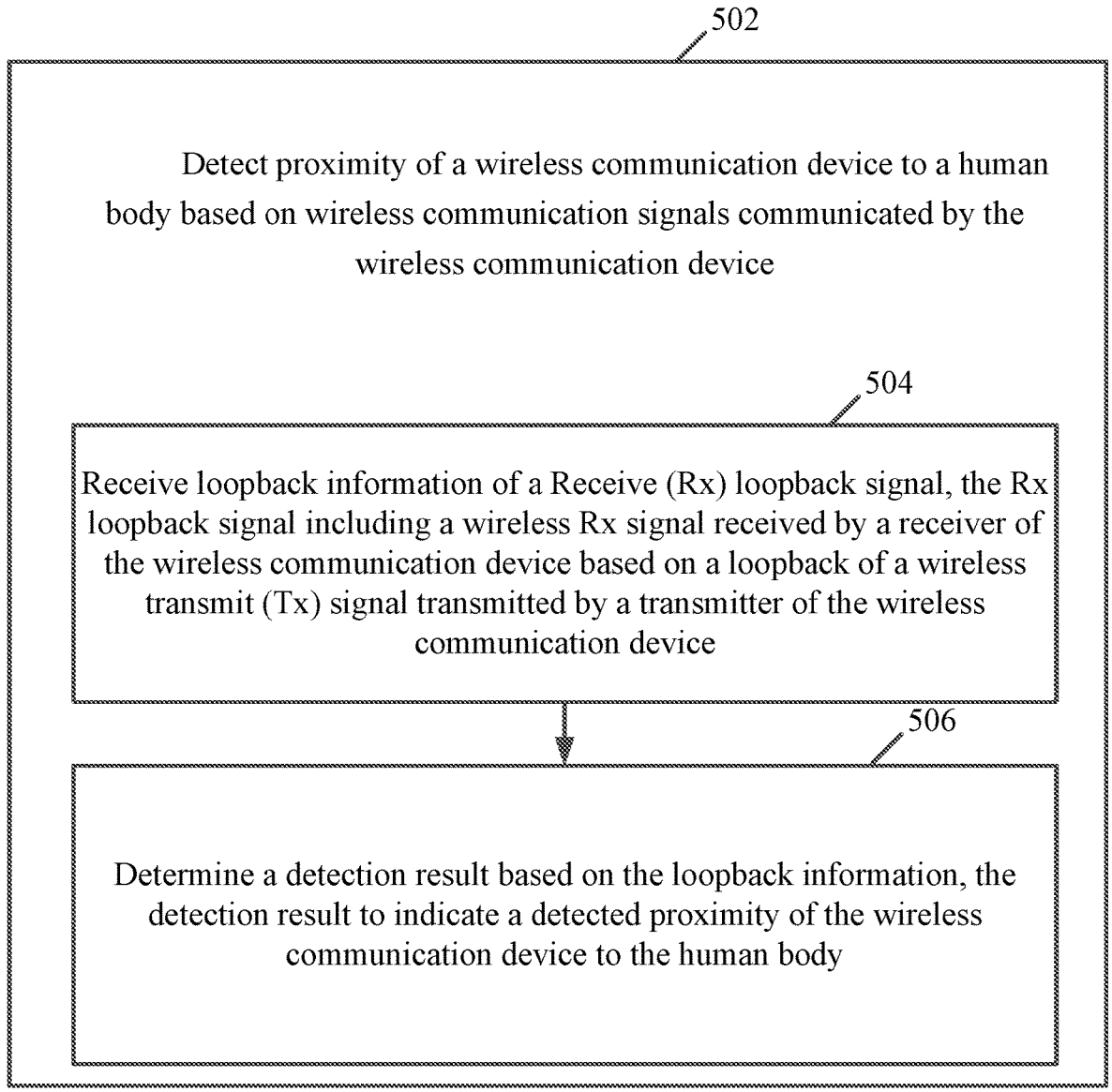
FIG. 5 is a schematic flow-chart illustration of a method of body proximity sensing, in accordance with some demonstrative aspects.

Reference is made to FIG. 5, which schematically illustrates a method of body proximity sensing, in accordance with some exemplary aspects For example, one or more operations of the method of FIG. 5 may be performed by one or more elements of a system, e.g., system 100 (FIG. 1), for example, a wireless device, e.g., device 102 (FIG. 1), a BPS, e.g., BPS 120 (FIG. 1), a processor, e.g., processor 126 (FIG. 1), a controller, e.g., controller 124 (FIG. 1), a radio, e.g., radio 114 (FIG. 1), and/or a receiver, e.g., receiver 116 (FIG. 1).

As indicated at block 502, the method may include detecting proximity of a wireless communication device to a human body based on wireless communication signals communicated by the wireless communication device. For example, BPS 120 (FIG. 1) may detect proximity of wireless communication device 102 (FIG. 1) to the human body 140 (FIG. 1), for example, based on the wireless communication signals communicated by the wireless communication device 102 (FIG. 1), e.g., as described above.

As indicated at block 504, detecting the proximity of the wireless communication device to the human body may include receiving loopback information of an Rx loopback signal including a wireless Rx signal received by a receiver of the wireless communication device based on a loopback of a wireless Tx signal transmitted by a transmitter of the wireless communication device. For example, input 122 (FIG. 1) may receive loopback information 125 (FIG. 1) of the Rx loopback signal including the wireless Rx signal received by receiver 116 (FIG. 1), for example, based on the loopback of the wireless Tx signal transmitted by transmitter 118 (FIG. 1), e.g., as described above.

As indicated at block 506, detecting the proximity of the wireless communication device to the human body may include determining a detection result based on the loopback information, the detection result to indicate a detected proximity of the wireless communication device to the human body. For example, processor 126 (FIG. 1) may determine the detection result based on the loopback information 125 (FIG. 1), for example, to indicate the detected proximity of the wireless communication device 102 (FIG. 1) to the human body 140 (FIG. 1), e.g., as described above.

Figure 6:
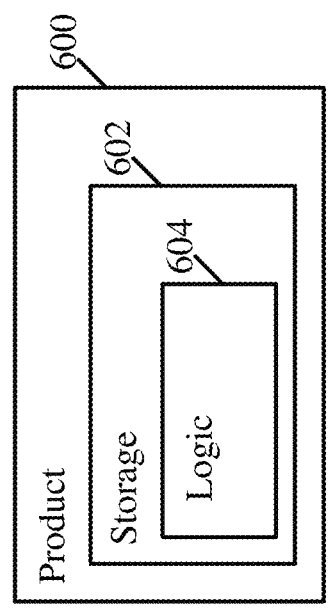
FIG. 6 is a schematic illustration of a product of manufacture, in accordance with some exemplary aspects.

Reference is made to FIG. 6, which schematically illustrates a product of manufacture 600, in accordance with some exemplary aspects. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at device 102 (FIG. 1), BPS 120 (FIG. 1), processor 126 (FIG. 1), controller 124 (FIG. 1), radio 114 (FIG. 1), receiver 116 (FIG. 1), transmitter 118 (FIG. 1), BPS 120 (FIG. 1), processor 126 (FIG. 1), controller 124 (FIG. 1), and/or message processor 128 (FIG. 1), to cause device 102 (FIG. 1), BPS 120 (FIG. 1), processor 126 (FIG. 1), controller 124 (FIG. 1), radio 114 (FIG. 1), receiver 116 (FIG. 1), transmitter 118 (FIG. 1), and/or message processor 128 (FIG. 1) to perform, trigger and/or implement one or more operations and/or functionalities, and/or to perform, trigger and/or implement one or more operations and/or functionalities described with reference to the FIGS. 1, 2, 3, 4 and/or 5, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 600 and/or machine-readable storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a Solid State Drive (SSD), and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language.

EXAMPLES

The following examples pertain to further aspects.

Example 1 includes an apparatus comprising a Body Proximity Sensor (BPS) configured to detect proximity of a wireless communication device to a human body based on wireless communication signals communicated by the wireless communication device, the BPS comprising an input to receive loopback information of a Receive (Rx) loopback signal, the Rx loopback signal comprising a wireless Rx signal received by a receiver of the wireless communication device based on a loopback of a wireless transmit (Tx) signal transmitted by a transmitter of the wireless communication device; and a processor configured to determine a detection result based on the loopback information, the detection result to indicate a detected proximity of the wireless communication device to the human body.

Example 2 includes the subject matter of Example 1, and optionally, wherein the processor is configured to identify a Tx path function based on the loopback information, the Tx path function is based on the Tx signal and the Rx signal, and to determine the detection result based on the Tx path function.

Example 3 includes the subject matter of Example 2, and optionally, wherein the Tx path function comprises a Tx distortion function representing an estimated distortion of the Tx signal in a wireless transmission path between the transmitter of the wireless communication device and the receiver of the wireless communication device.

Example 4 includes the subject matter of Example 2 or 3, and optionally, wherein the Tx path function comprises a Voltage Standing Wave Ratio (VSWR) function representing an estimated VSWR of a wireless transmission path between the transmitter of the wireless communication device and the receiver of the wireless communication device.

Example 5 includes the subject matter of any one of Examples 2-4, and optionally, wherein the processor is configured to identify a plurality of coefficients of the Tx path function based on the loopback information, and to determine the detection result based on the plurality of coefficients of the Tx path function.

Example 6 includes the subject matter of Example 5, and optionally, wherein the processor is configured to determine the detection result based on a comparison between the plurality of coefficients of the Tx path function and a plurality of reference coefficients of a reference Tx path function.

Example 7 includes the subject matter of any one of Examples 2-6, and optionally, wherein the processor is configured to determine the detection result based on a comparison between a difference result and a difference threshold, the difference result based on a difference between a coefficient of the Tx path function and a reference coefficient of a reference Tx path function.

Example 8 includes the subject matter of Example 7, and optionally, wherein the difference threshold comprises a preconfigured threshold based on a configuration of the wireless communication device.

Example 9 includes the subject matter of any one of Examples 1-8, and optionally, comprising a memory to store reference loopback information, wherein the processor is configured to determine the detection result based on a comparison between the loopback information and the reference loopback information.

Example 10 includes the subject matter of any one of Examples 1-9, and optionally, wherein the BPS is configured to instruct the wireless communication device to transmit the Tx signal based on a proximity sensing criterion.

Example 11 includes the subject matter of any one of Examples 1-10, and optionally, wherein the BPS is configured to instruct the wireless communication device to periodically transmit the Tx signal based on a proximity sensing periodicity.

Example 12 includes the subject matter of any one of Examples 1-11, and optionally, wherein the BPS is configured to instruct the wireless communication device to transmit the Tx signal over a predefined wireless communication channel for proximity sensing.

Example 13 includes the subject matter of any one of Examples 1-12, and optionally, wherein the BPS is configured to output a Tx power limitation based on the detection result, the Tx power limitation to limit a Tx power of the transmitter of the wireless communication device.

Example 14 includes the subject matter of any one of Examples 1-13, and optionally, wherein the BPS is configured to output a Specific Absorption Rate (SAR) limitation indication based on the detection result.

Example 15 includes the subject matter of any one of Examples 1-14, and optionally, comprising the transmitter, the receiver, and one or more antennas.

Example 16 comprises a wireless communication device comprising the apparatus of any one of Examples 1-15.

Example 17 comprises an apparatus comprising means for executing any of the described operations of Examples 1-15.

Example 18 comprises a product comprising one or more tangible computer-readable non-transitory storage media comprising computer-executable instructions operable to, when executed by at least one processor, enable the at least one processor to cause a device to perform any of the described operations of Examples 1-15.

Example 19 comprises an apparatus comprising: a memory interface; and processing circuitry configured to: perform any of the described operations of Examples Example 20 comprises a method comprising any of the described operations of Examples 1-15.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a Body Proximity Sensor (BPS) configured to detect proximity of a wireless communication device to a human body based on wireless communication signals communicated by the wireless communication device, the BPS comprising:
an input to receive loopback information of a Receive (Rx) loopback signal, the Rx loopback signal comprising a wireless Rx signal received by a receiver of the wireless communication device based on a loopback of a wireless transmit (Tx) signal transmitted by a transmitter of the wireless communication device; and
a processor configured to determine a detection result based on the loopback information, the detection result to indicate a detected proximity of the wireless communication device to the human body, wherein the processor is configured to identify a Tx path function based on the loopback information, the Tx path function is based on the wireless Tx signal and the wireless Rx signal, and to determine the detection result based on the Tx path function.

2. The apparatus of claim 1, wherein the Rx loopback signal comprises the wireless Rx signal attenuated by a power attenuator of the receiver of the wireless communication device and mixed by one or more mixers of the receiver of the wireless communication device.

3. The apparatus of claim 1, wherein the Tx path function comprises a Tx distortion function representing an estimated distortion of the wireless Tx signal in a wireless transmission path between the transmitter of the wireless communication device and the receiver of the wireless communication device.

4. The apparatus of claim 1, wherein the Tx path function comprises a Voltage Standing Wave Ratio (VSWR) function representing an estimated VSWR of a wireless transmission path between the transmitter of the wireless communication device and the receiver of the wireless communication device.

5. The apparatus of claim 1, wherein the processor is configured to identify a plurality of coefficients of the Tx path function based on the loopback information, and to determine the detection result based on the plurality of coefficients of the Tx path function.

6. The apparatus of claim 5, wherein the processor is configured to determine the detection result based on a comparison between the plurality of coefficients of the Tx path function and a plurality of reference coefficients of a reference Tx path function.

7. The apparatus of claim 1, wherein the processor is configured to determine the detection result based on a comparison between a difference result and a difference threshold, the difference result based on a difference between a coefficient of the Tx path function and a reference coefficient of a reference Tx path function.

8. The apparatus of claim 7, wherein the difference threshold comprises a preconfigured threshold based on a configuration of the wireless communication device.

9. The apparatus of claim 1 comprising a memory to store reference loopback information, wherein the processor is configured to determine the detection result based on a comparison between the loopback information and the reference loopback information.

10. The apparatus of claim 1, wherein the BPS is configured to instruct the wireless communication device to transmit the wireless Tx signal based on a proximity sensing criterion.

11. The apparatus of claim 1, wherein the BPS is configured to instruct the wireless communication device to periodically transmit the wireless Tx signal based on a proximity sensing periodicity.

12. The apparatus of claim 1, wherein the BPS is configured to instruct the wireless communication device to transmit the wireless Tx signal over a predefined wireless communication channel for proximity sensing.

13. The apparatus of claim 1, wherein the BPS is configured to output a Tx power limitation based on the detection result, the wireless Tx power limitation to limit a Tx power of the transmitter of the wireless communication device.

14. The apparatus of claim 1, wherein the BPS is configured to output a Specific Absorption Rate (SAR) limitation indication based on the detection result.

15. The apparatus of claim 1 comprising the transmitter, the receiver, and one or more antennas.

16. A product comprising one or more tangible computer-readable non-transitory storage media comprising computer-executable instructions operable to, when executed by at least one processor, enable the at least one processor to cause a Body Proximity Sensor (BPS) of a wireless communication device to:
  process loopback information of a Receive (Rx) loopback signal, the Rx loopback signal comprising a wireless Rx signal received by a receiver of the wireless communication device based on a loopback of a wireless transmit (Tx) signal transmitted by a transmitter of the wireless communication device; and
  determine a detection result based on the loopback information, the detection result to indicate a detected proximity of the wireless communication device to a human body, wherein the instructions, when executed, cause the BPS to identify a Tx path function based on the loopback information, the Tx path function is based on the wireless Tx signal and the wireless Rx signal, and to determine the detection result based on the Tx path function.

17. The product of claim 16, wherein the Rx loopback signal comprises the wireless Rx signal attenuated by a power attenuator of the receiver of the wireless communication device and mixed by one or more mixers of the receiver of the wireless communication device.

18. The product of claim 16, wherein the instructions, when executed, cause the BPS to identify a plurality of coefficients of the Tx path function based on the loopback information, and to determine the detection result based on the plurality of coefficients of the Tx path function.

19. The product of claim 18, wherein the instructions, when executed, cause the BPS to determine the detection result based on a comparison between the plurality of coefficients of the Tx path function and a plurality of reference coefficients of a reference Tx path function.

20. The product of claim 16, wherein the instructions, when executed, cause the BPS to determine the detection result based on a comparison between a difference result and a difference threshold, the difference result based on a difference between a coefficient of the Tx path function and a reference coefficient of a reference Tx path function.

21. The product of claim 16, wherein the instructions, when executed, cause the BPS to instruct the wireless communication device to transmit the wireless Tx signal based on a proximity sensing criterion.

22. The product of claim 16, wherein the instructions, when executed, cause the BPS to instruct the wireless communication device to transmit the wireless Tx signal over a predefined wireless communication channel for proximity sensing.

23. The product of claim 16, wherein the instructions, when executed, cause the BPS to output a Tx power limitation based on the detection result, the Tx power limitation to limit a Tx power of the transmitter of the wireless communication device.

24. An apparatus of a Body Proximity Sensor (BPS) for a wireless communication device, the apparatus comprising:
  means for processing loopback information of a Receive (Rx) loopback signal, the Rx loopback signal comprising a wireless Rx signal received by a receiver of the wireless communication device based on a loopback of a wireless transmit (Tx) signal transmitted by a transmitter of the wireless communication device; and
  means for determining a detection result based on the loopback information, the detection result to indicate a detected proximity of the wireless communication device to a human body, wherein the means for determining the detection result comprises means for identifying a Tx path function based on the loopback information, the Tx path function is based on the wireless Tx signal and the wireless Rx signal, and determining the detection result based on the Tx path function.

25. The apparatus of claim 24, wherein the Tx path function comprises a Tx distortion function representing an estimated distortion of the wireless Tx signal in a wireless transmission path between the transmitter of the wireless communication device and the receiver of the wireless communication device.

* * * * *